United States Patent
Heep

(10) Patent No.: US 7,419,358 B2
(45) Date of Patent: Sep. 2, 2008

(54) METHOD AND DEVICE FOR COMPENSATION OF THE THERMAL EXPANSION OF A CELLULAR WHEEL SLUICE ROTORS

(75) Inventor: Dieter Heep, Bergatreute (DE)

(73) Assignee: Zeppelin Silos & Systems GmbH, Friedrichshafen (DE)

( * ) Notice: Subject to any disclaimer, the term of this patent is extended or adjusted under 35 U.S.C. 154(b) by 283 days.

(21) Appl. No.: 11/212,129

(22) Filed: Aug. 25, 2005

(65) Prior Publication Data

US 2006/0045729 A1    Mar. 2, 2006

(30) Foreign Application Priority Data

Aug. 26, 2004  (DE)  ......................... 10 2004 041 254

(51) Int. Cl.
  *G01F 11/10*   (2006.01)
(52) U.S. Cl. ............... 416/178; 416/186 R; 416/241 R; 222/368
(58) Field of Classification Search .................... 46/178; 222/367–368, 370; 416/178, 186 R, 241 R
See application file for complete search history.

(56) References Cited

U.S. PATENT DOCUMENTS

| | | | | |
|---|---|---|---|---|
| 4,155,486 A | * | 5/1979 | Brown | 222/197 |
| 4,179,043 A | * | 12/1979 | Fischer | 222/368 |
| 4,784,298 A | | 11/1988 | Heep et al. | 222/350 |
| 4,915,265 A | * | 4/1990 | Heep et al. | 222/368 |
| 5,014,885 A | | 5/1991 | Heep et al. | 222/368 |
| 5,307,963 A | * | 5/1994 | Mitchell | 222/368 |
| 6,237,816 B1 | | 5/2001 | Boritzki | 222/368 |

FOREIGN PATENT DOCUMENTS

| | | |
|---|---|---|
| DE | 1 073 388 | 1/1960 |
| DE | 1 174 257 | 7/1964 |
| DE | 36 23 454 | 10/1987 |
| DE | 37 42 521 | 4/1989 |
| DE | 37 42 519 | 1/1995 |
| DE | 199 36 136 | 2/2001 |
| DE | 101 43 192 | 3/2003 |
| DE | 103 17 824 | 6/2004 |

OTHER PUBLICATIONS

Destoop, T. et al., "Minimum Gas Leakage Through Rotary Feeders Used In Dense Phase Pneumatic Conveying Systems", vol. 15, No. 1, Jan./Feb. 2003, Powder Handling and Processing.

* cited by examiner

*Primary Examiner*—Edward Look
*Assistant Examiner*—Devin Hanan
(74) *Attorney, Agent, or Firm*—Baker & Daniels LLP

(57) ABSTRACT

A cellular wheel sluice for the feeding of hot bulk material with stabilization of the radial play between the web ends of the cellular wheel and the wall of the housing borehole by means of the combination of materials of different thermal expansion coefficients, whereby for stabilization of the radial play between the walls of the cellular wheel and the case wall its changes of diameter caused by heat are compensated. End strips used for sealing the gap, in their radial expansion, are fixed in a retention body with a low thermal expansion coefficient and therefore are always kept at a temperature-independent constant external diameter from the cellular wheel shaft.

21 Claims, 7 Drawing Sheets

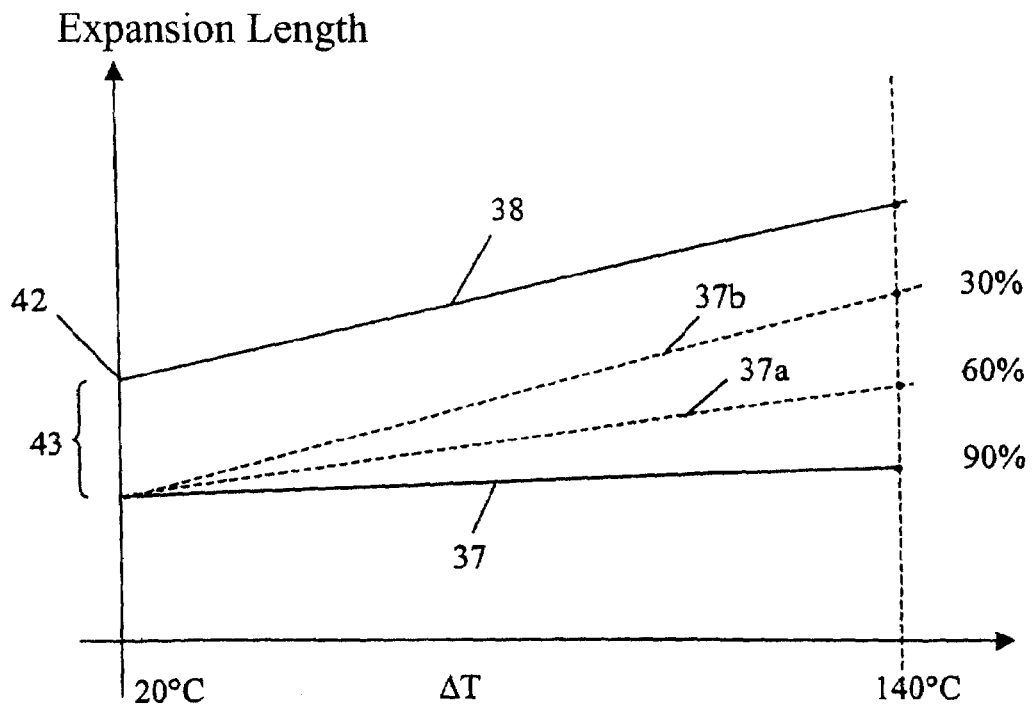
Fig.6
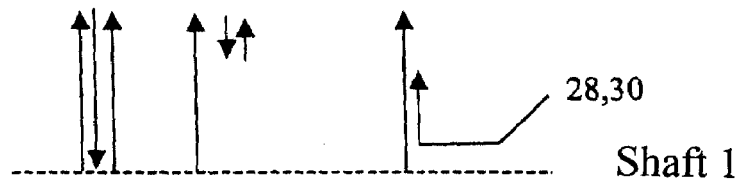
Fig.7 (St. d. T)   Fig.8   Fig.9
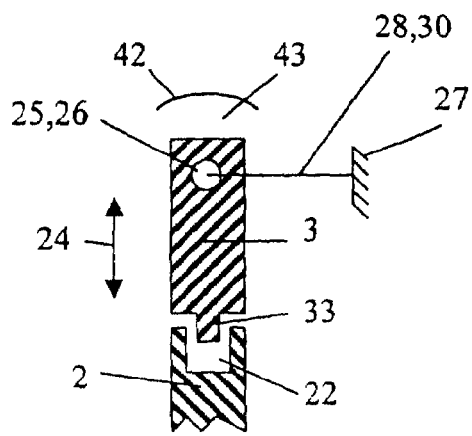
Fig. 10

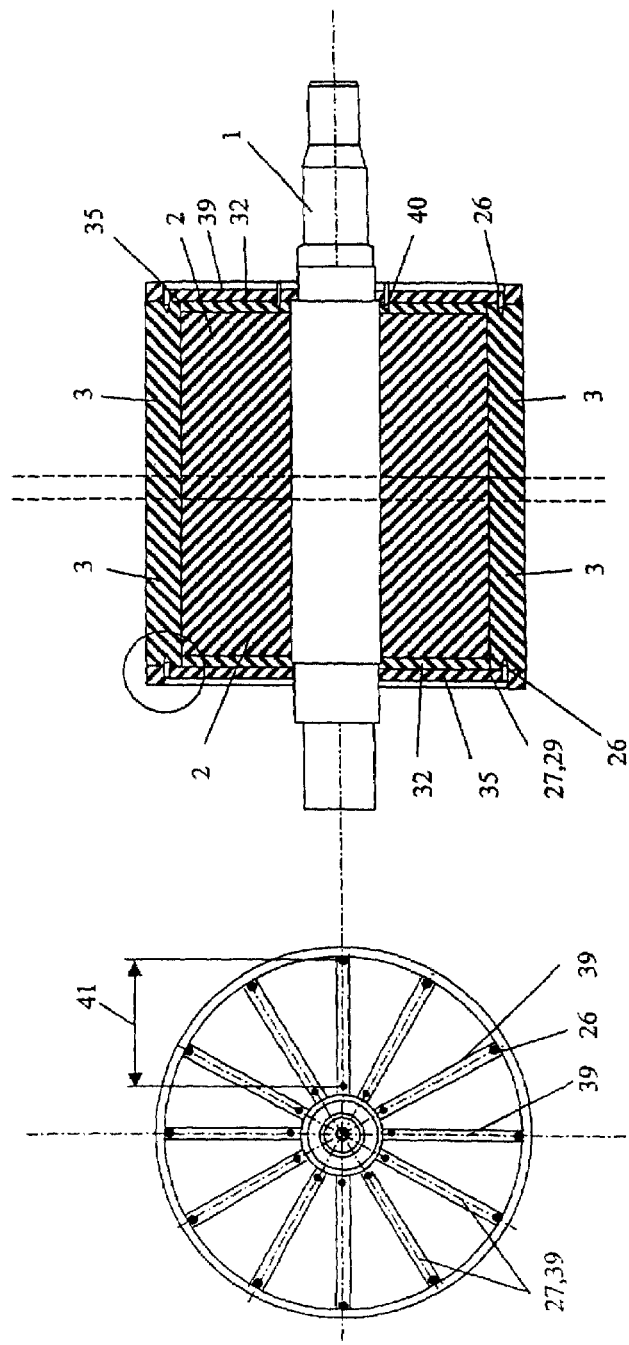

METHOD AND DEVICE FOR COMPENSATION OF THE THERMAL EXPANSION OF A CELLULAR WHEEL SLUICE ROTORS

BACKGROUND OF THE INVENTION

The invention relates to a method and a device for governing of a rotor diameter. Devices of this type are used to prevent a jamming of the sluice rotor in the case when during the startup of a system the hot bulk material heats the rotor up faster than the case and said rotor then touches the case beyond its diameter enlargement.

In accordance with the state of the art a compromise of preheating of the case and production of a larger radial gap at about 20° Celsius manufacturing temperature is selected in order to obtain a below operating temperature which excludes a contact of the rotor on the case.

The price for this is higher leakage values in the starting up phase until ultimately the pre-calculated operating gap is formed from the production gap by means of the complex process of the case pre-heating and the thermal expansion of the rotor. References to this are to be found in the publication "Powder handling & processing: Minimum gas leakage through rotary feeders used in (hot) Dense Phase Pneumatic Conveying Systems", Vol. 15, No. 1, January/February 2003.

In DE 37 42 519 and in DE 37 42 521 controlled plastic strips are used in order to make the rotor diameter changeable. Further the most varied webs adjustment options have become well known, from spring contacts to the application of pneumatic or hydraulic auxiliary energy.

All of these solutions are built on web grooves which are difficult to manufacture, and their radial alteration. If one mills the finished cellular wheel by means of the assistance of a side and face milling cutter, one always finds buckled webs caused by welding. When the web is milled, the area buckles when welding takes place on the web. In the case of the cellular wheel sluice sizes in demand on the market of 500 to 800 diameters this is an expensive, pointless underpinning.

Another method of solution attempts to achieve optimum operating cracks by means of temperature-dependent shifting of a conical rotor in the tapered case diameter with the help of an adjustment device.

DE 199 36 136 describes the most variable solutions in which resources for measurement of the distance between the cellular wheel and the case bore are present and the cellular wheel and/or the case bore is radially deformable at least locally in dependency on the measured value.

DE 11 74 257 also builds on the web grooves in which by means of a directional solution plates corresponding to the radial and axial cellular wheel wall length made of different, thermally expansible plastics were proposed.

The plastics are arranged in such a way that the introduced temperature can perform a diameter compensation of the cellular wheel in dependency on the temperature. In similar fashion the selection of the material for the case to the cellular wheel material can have an influence on the dimension of the operating gap.

This solution has not gained acceptance in practice. It is known that the temperature expansion takes place three-dimensionally. Unfortunately DE 11 74 257 does not give any information about the effect of plate expansion in an axial direction, in particular the effect on the fastening screws Items 6 and 7, which are exposed to impermissible tensions over the length of the plate connections, is not given.

The plates of higher thermal expansion expand in all three space axes with the appropriate heat action. For this reason, in the case of the cited publication the disadvantage of an unavoidable bimetallic effect existed, which results from the fact that the displacement body extends over the entire axial length of the cellular wheel web and due to its great expansion caused by the heat, bulges between the fastening screws.

Consequently the functionality of the expansion device would no longer be given, because the discarding of the displacement bodies in the very narrow clearing of the cellular wheel web lead to too high friction values at the web groove wall, which prevented a compensating movement.

The unavoidable bimetallic effect resulting in axial direction can also jeopardize the movement in the web groove in radial direction, as well as the penetration of the bulk material into the plate sandwich slot combination. The cause for the susceptibility for failure is the fact that plate Item 3 is in one piece. The jamming effects that as appear a result made the device unusable.

SUMMARY OF THE INVENTION

In this connection the invention proceeds in its generic term from the object of DE 11 74 257, from which—in conformity with the object of the invention—a cellular wheel sluice for the feeding or extracting of bulk material is given as known, in which to stabilize the radial play between the walls of the cellular wheel and the case wall whose diameter changed caused by heat are compensated by means of the combination of materials of different thermal expansions. In this connection each wall of the cellular wheel is composed of plate-shaped parts of different thermal expansion running parallel to one another.

The invention is based on the object of controlling the gap mass between the cellular wheel and the case bore hole during starting and stopping and/or in process-conditioned changes of the operating temperature in such a way that a minimum gap is guaranteed which reduces the leakage to a minimum mass, simultaneously however permits a bending of the cellular wheel by means of pressure difference without touching the case borehole.

It is important that in a first embodiment in accordance with the equation: Cellular wheel radius×cellular wheel web-material expansion coefficient×Material temperature=displacement device length×Displacement device material expansion coefficient×material temperature (reducible from this with the same value) the construction is executed with at least two displacement devices whose fastenings together, viewed in an axial direction, remain temperature-dependently uncontrolled.

Particularly advantageous is the integration of the displacement device in only a part of the cellular wheel web so that the problematic web groove proposed by the state of the art, deep, and continuing up to the shaft, can be dropped entirely.

In a reversal of the first inventive proposal, a second embodiment—for which special protection is claimed—specifies that with regard to the first embodiment an equal temperature expansion direction is defined.

In opposition to the first solution the equation from the second embodiment reads: Cellular wheel radius×cellular wheel web-material expansion coefficient×Material temperature minus retention device length×retention material-expansion coefficient×material temperature (reducible from this with the same value) is equal to the desired, preplanned expansion of the rotor diameter.

In the first case the displacement direction material-expansion coefficient is many times greater than that of the cellular wheel material; in the second case conversely the retention material-expansion coefficient is many times smaller than that of the cellular wheel material.

The construction is also designed with two retention devices whose fastening together, viewed in an axial direction, remains temperature-dependently uncontrolled.

Thus according to the second proposal a retention device is proposed which has a very low temperature-expansion coefficient. Ideally a material will be used which exhibits the lowest temperature-expansion coefficient with a material expenditure that can still be justified.

For example, such a material is material number 1.3912 which is sold under the brand name of "NILO Alloy 36".

This material is an iron-nickel alloy with very low thermal expansion and with 36% nickel content. It is almost mass constant in the normal range of atmospheric temperatures and possesses a low expansion coefficient up to low temperatures (up to circa 260° Celsius).

Such a material is now used as a retention device, so to speak as an anchor point, on which the end strips are fixed in radial direction (by front-side fixtures arranged in an axial direction). The temperature-dependent expansion outward in radial direction is consequently fixed and secured at a defined and determined external diameter. Consequently the end strips can only expand directed radially inward (and also axially). This ensures that the end strips always exhibit a precisely defined gap mass in the direction toward the inner periphery of the case borehole of the cellular wheel sluice, said gap mass which is independent from temperature expansions because the temperature expansion of the expansion-stable retention device is practically negligible.

In this connection a constant case temperature is assumed. Such a constant case temperature is achieved in particular by means of cooling the case.

Now it is important that the critical end strips serving the purpose of sealing the gap are fixed in their radial expansion in a retention body with a low thermal expansion coefficient and are therefore always kept at a temperature-independent constant external diameter spaced apart from the shaft. The retention point of the retention device to the end strips should be applied as far as possible radially outward to the end strips in order to suppress an expansion of the end strips in a radial direction toward the outside.

However the end strips are guided on temperature-dependent expandable cellular wheel webs in radial direction. This guide serves as a balance of the radial expansion of the cellular wheel webs which consequently can more or less approach or remove the outward lying, temperature-independent fixed end strips. Such a guide can also be termed as (acting in radial direction) expansion joint or compensating joint.

The guiding of the end strips in the region of the expansion joint or compensating joint can be realized in different embodiments:

In a first preferred embodiment it is a front end guide, whereby at the radial external front ends of the cellular wheel webs longitudinal slots are arranged, in which the end strips are radially (and preferably also axially) moveably guided with integrated extensions.

With this a significant advantage is achieved, the fact that the attachment is bipartite, namely the end strips are each fixed at their axial outer front ends in a retention device, however can be moveably guided inwardly in cellular wheel webs that are expandable in radial direction.

Both materials (the end strips and the cellular wheel webs) are preferably made of the same material and therefore also expand uniformly in axial direction. However, this is not to be understood as restricting. The invention also provides for the selection of another material for the end strips than comparatively for the material of the cellular wheel webs.

In the case of the same material selection there is no undulation (bimetallic effect), which is considered to be a disadvantage, as had to be put up with in the case of the state of the art, in particular with DE 11 74 257.

In the case of different material selection however a movement in radial and axial directions can occur between the end strip and the cellular wheel web in the region of the guide.

Compared to the initially named embodiment there is now the advantage that plastic expansion bodies can be dispensed with. The second embodiment uses only metal materials, which ensures a better resistance in the case of higher temperatures.

In the first embodiment it is proposed to manufacture the device out of plastic material, in particular Arlon. This is a PEEK compound which according to the state of the art possesses the highest resistance for the expected operating temperature of 165 degrees Celsius and whose temperature expansion coefficient amounts to approximately seven times the capacity of nickel chromium steel (as a material for the cellular wheel web and for the end strip).

The plastic consequently can in the simplest manner with cellular wheel diameters of 500 to 800 mm be applied to the cellular wheel web ends in the form of single or double strips, which in the case of a temperature change each according to the selected displacement device length compensate for the temperature-dependent, radial length change of the cellular wheel web.

In the reverse case, in accordance with the second solution it is proposed to manufacture the retention device out of a low-expansion metal material, preferably an iron-nickel alloy, as used for example for the manufacture of standard meter copies in order to make use of its low temperature-expansion coefficients in the case of an expected operating temperature of 165° Celsius, which amounts to only 10% of the nickel chromium steel used for the production of the cellular wheel and the end strips.

Once the cellular wheel diameter has been invariably defined on the temperature expansion line, in a second procedure step the influence of the bulk material temperature on the case diameter can also be eliminated by cooling the case.

With this the sluice clearance predetermined by production is continuously preserved in all process temperature change ranges.

It is a significant feature of the invention that the undesirable bimetallic effect in accordance with DE 11 74 257 is cancelled out as a result of the fact that the parts that were previously adjacent to each other in a peripheral direction, namely the displacement body and the end strip are now no longer joined together in peripheral direction.

The displacement body is inserted in axial extension of the cellular wheel web in integrated recess of the cellular wheel web with three-dimensional play. This means that it has radial and axial play and also has play running in a peripheral direction. These permitted directions of play of the displacement body now no longer result in undesirable jamming effects at the end strip fastened there, because in all three directions in space there are corresponding play adjustment routes.

The crux of the present invention lies in the case of the first embodiment in the recognition that one cancels out a web groove present in accordance with DE 11 74 257 and instead of that inserts the displacement body in integrated play-affected recesses of the cellular wheel web and in the process at the same time limits the axial length of the respective displacement body so severely that a or undesirable bimetallic effect in axial direction is prevented.

For this purpose the invention provides in an expedient embodiment that in axial direction at least two displacement bodies are supported in tandem and completely independently from one another in integrated recesses of the cellular wheel web.

Of course the present invention is not dependent on the arrangement of two displacement bodies in tandem in axial direction. In the simplest embodiment it is sufficient, in the case of short cellular wheel webs, to arrange only a single displacement body play-affected in an integrated recess in the cellular wheel web.

In other embodiments provision can be made for the arrangement of two or more of the displacement bodies in axial distance in tandem in recesses of the cellular wheel web.

In an improvement of the invention provision is made that the displacement bodies are not supported in recesses of the cellular wheel web, but rather in recesses of the end strips, so that the inventive solution is not restricted to the arrangement of the displacement bodies in recesses in the cellular wheel web.

In the second proposed solution, in opposition to the reverse direction of movement of the first proposed solution, it is proposed that the expansion-stable retention device is constructed within and/or outside of the cellular wheel interior as rings, disks or spoke-shaped flat material for holding of the end strips, so that this inventive solution is not restricted to the reverse direction of expansion of the first proposed solution.

The inventive object of the present invention does not result only from the subject matter of the individual patent claims, but rather also from the combination of the individual patent claims with one another.

All information and features disclosed in the documents, including the abstract, in particular the spatial design represented in the drawings, are claimed as essential to the invention, in so far as they are new in comparison to the state of the art, either individually or in combination.

BRIEF DESCRIPTION OF THE DRAWINGS

In the following the invention will be explained in greater detail with the help of several drawings representing embodiment paths. In this connection further features and advantages essential to the invention appear from the drawings and their description.

The figures show the following:

FIG. 6: the graphical representation of the expansion length relating to a temperature change in the range between 20° and 140° Celsius;

FIG. 7: the compensation principle according to the state of the art (DE 11 74 257);

FIG. 8: the compensation principle according to FIGS. 1 through 4;

FIG. 9: the compensation principle according to FIGS. 5 through 13;

FIG. 10: a detailed representation of the radial guide of the end webs in the cellular wheel webs;

FIG. 11: a left partial section through a cellular wheel in assembled state as per FIG. 5;

FIG. 12: a right partial section through a different embodiment with a spoke-shaped retention device;

FIG. 13: the front view of the spoke-shaped retention device.

DETAILED DESCRIPTION

Figure 1:
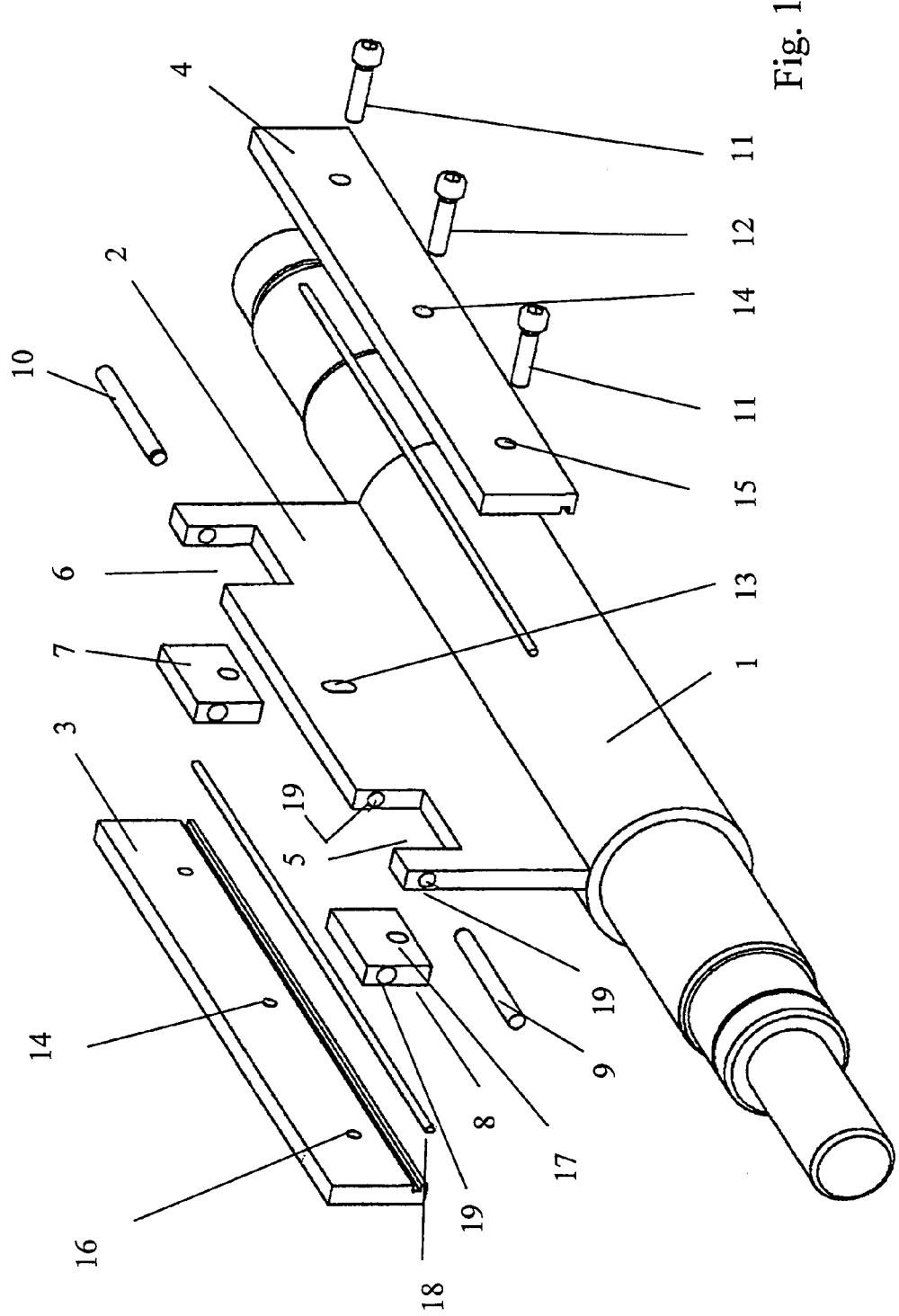
FIG. 1: exploded view of a single cellular wheel web of a cellular wheel sluice.
Figure 2:
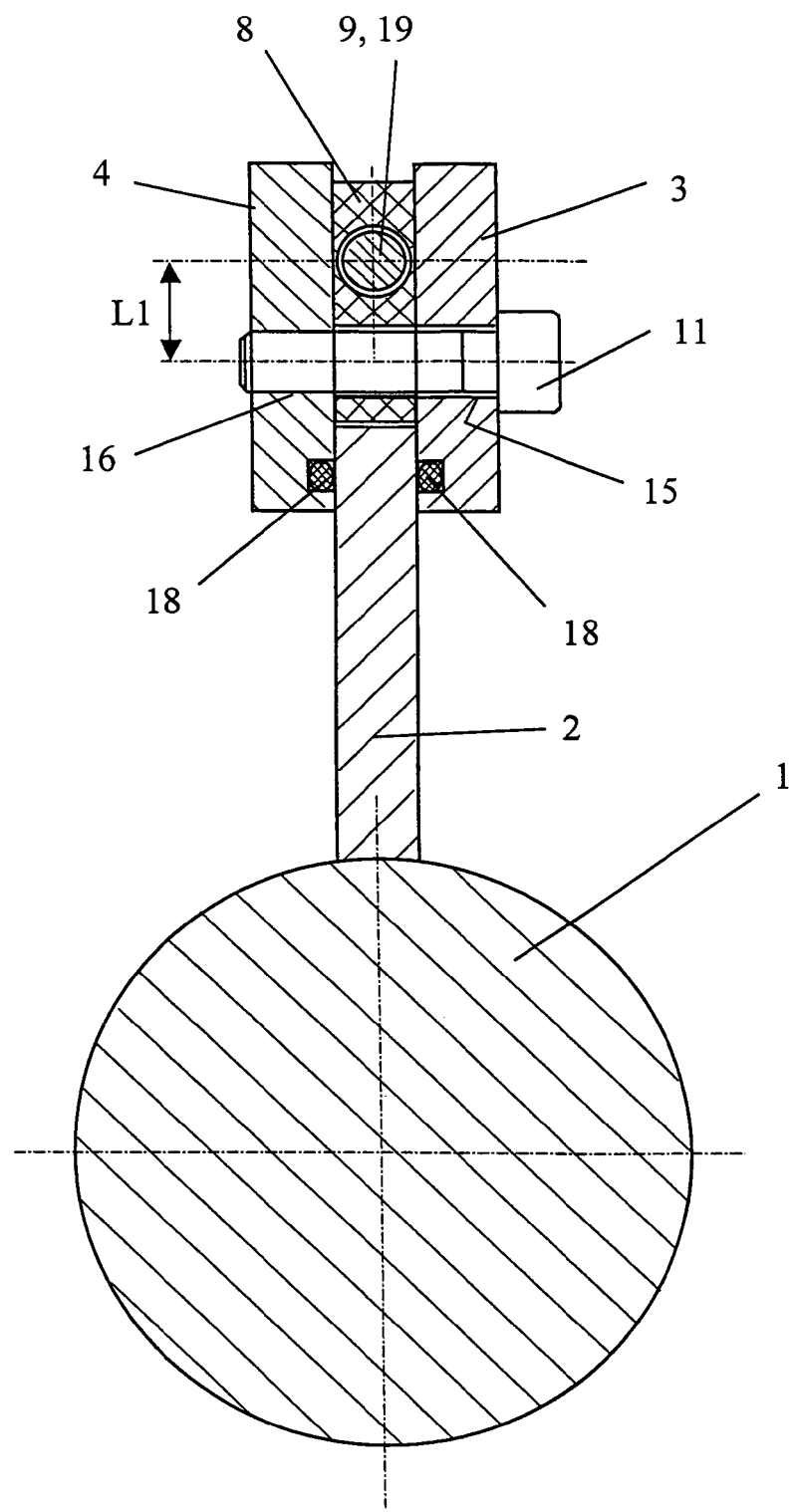
FIG. 2: section as per Line II-II in FIG. 3.

In the represented drawings only a single cellular wheel web 2 is depicted, which is locked to a cellular wheel shaft 1. The connection between cellular wheel web 2 and cellular wheel shaft 1 is in other respects random. The cellular wheel web 2 can be cast on the cellular wheel shaft 1, molded to it or be fastened in any manner as a two-piece part.

The end strips 3, 4 are used for the purpose of sealing the inside wall of a cellular wheel case not described in greater detail, said end strips being equipped with the inventive temperature compensation device.

In this way it is guaranteed that regardless of the temperature of the bulk material and other temperature influences there is always an equal distance between the upper front wall of the respective end strips 3, 4 and the case inside wall of the cellular wheel sluice which is not described in greater detail.

In the example for application shown two end strips 3, 4 are depicted facing one another. However, the invention is not limited to this. In another embodiment it can also be provided that only a single end strip 3 or 4 is present.

In the shown embodiment two recesses 5, 6 opened to the top in tandem in axial direction are provided for the play-affected support of displacement bodies 7, 8 supported there.

Each displacement body can expand in the recesses 5, 6 in a three-dimensional direction subject to the temperature.

For the purpose of supporting the displacement bodies 7, 8, each displacement body has a pin 9, 10 assigned to it, which fits in an integrated borehole 19, which is axially arranged in the cellular wheel web 2 and which bridges the recess 5, 6.

In this way a radial support of each displacement body 7, 8 takes place, so that said displacement body is firmly connected to the cellular wheel web 2. Thus the respective pins 9, 10 together with the integrated borehole 19 form the fixed point for the length L1 between the displacement bodies 7, 8 and the integrated cellular wheel web 2.

In accordance with FIG. 1 the two end strips 3, 4 are now each connected to the displacement bodies 7, 8 with screws 11 staggered in axial direction. The screw 11 travels through borehole 15, penetrates borehole 17 and engages in an integrated borehole 16 at the opposing end strip 4. The bolt of the screw 11 should penetrate the borehole 17 in displacement bodies 7, 8 if at all possible with little play, in order to guarantee an optimum transfer of the clearance of motion (if at all possible free from backlash).

The same explanation applies in other respects for the additional screw 11 in tandem in axial direction which is shown in FIG. 11.

A further fastening of the two end strips 3, 4 to one another takes place by means of screw 12, which penetrates through an integrated borehole 14 in the first end strip 4, passes through an oblong hole in the region of the cellular wheel web 2, said oblong hole guaranteeing a large axial and radial play and on the opposite side engages in borehole 14 in end strip 3, which is preferably constructed as a tapped hole.

In this way the two end strips 3, 4 are fastened to each other and are however fastened play-affected in axial direction on the cellular wheel web 4 in order to compensate for the temperature play acting in radial direction.

It is also to be mentioned that a gasket cord 18 is arranged at the interior of each end strip 3, 4 in order to make possible an integrated sealing at the cellular wheel web 2 and still permit a radial clearance of motion.

Figure 4:
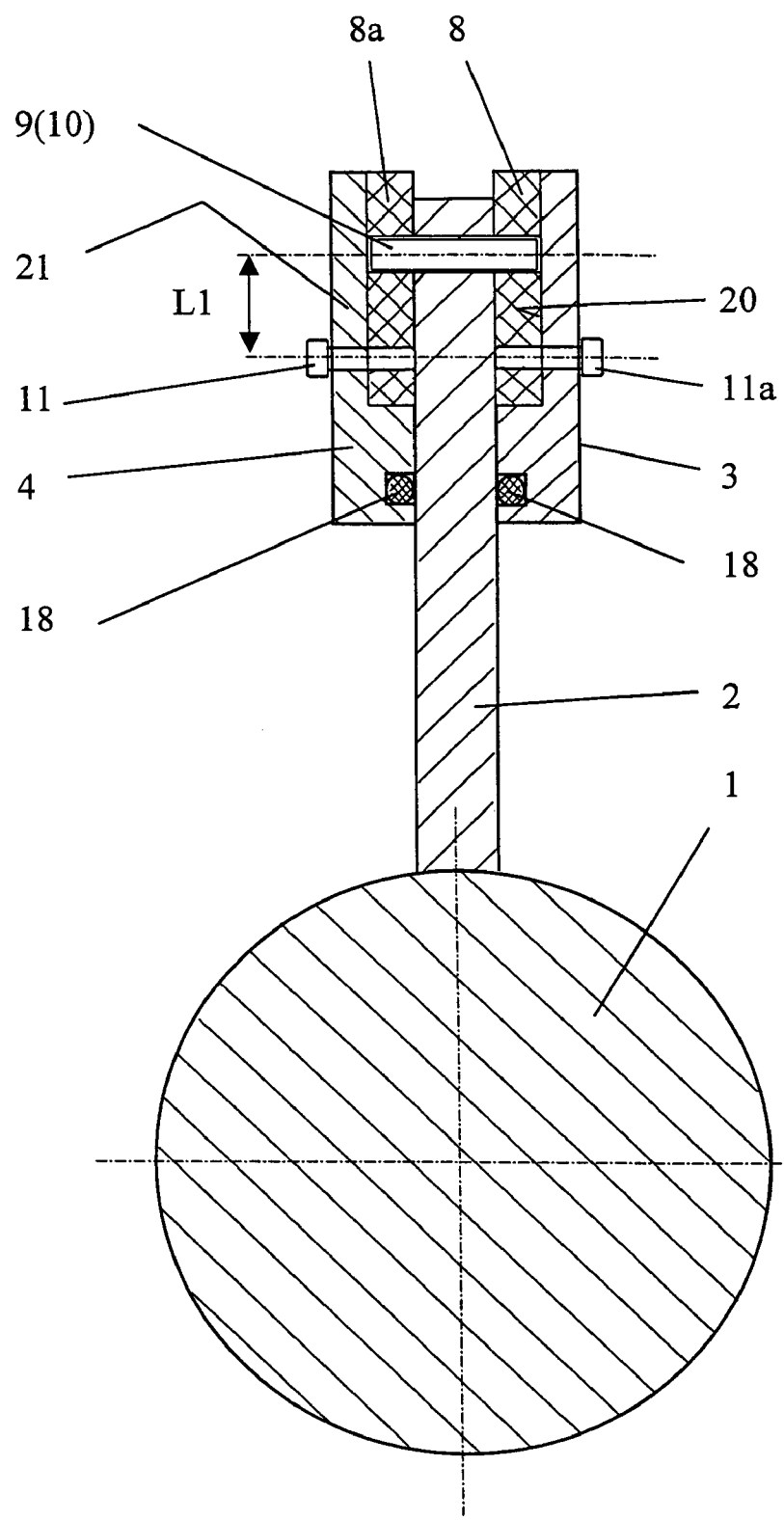
FIG. 4: a transformed embodiment in comparison with FIG. 2, in which the recesses for the displacement bodies are arranged in the end strips.

FIG. 4 depicts as a further embodiment a cellular wheel web 2 in which the recesses 5, 6 are lacking and at which the respective displacement bodies 7, 8 are arranged laterally and in this connection are matched to recesses 20, 21 of the end strips 3, 4.

Recesses 20, 21 are for production reasons opened toward the top in order to insert the displacement bodies 7, 8 there. However, they can also be closed to the top in radial direction.

It is important that the recesses 20, 21 are constructed in such a way that they make possible a sufficient thermal clearance in three-dimensional direction for the displacement bodies 7, 8 arranged there.

The upper fixed point for connection of the displacement body 7 to the cellular wheel web 2 is formed by the pins 9, 10, which secure the displacement bodies 7, 8 in position both as free of clearance as possible and immobile.

Figure 3:
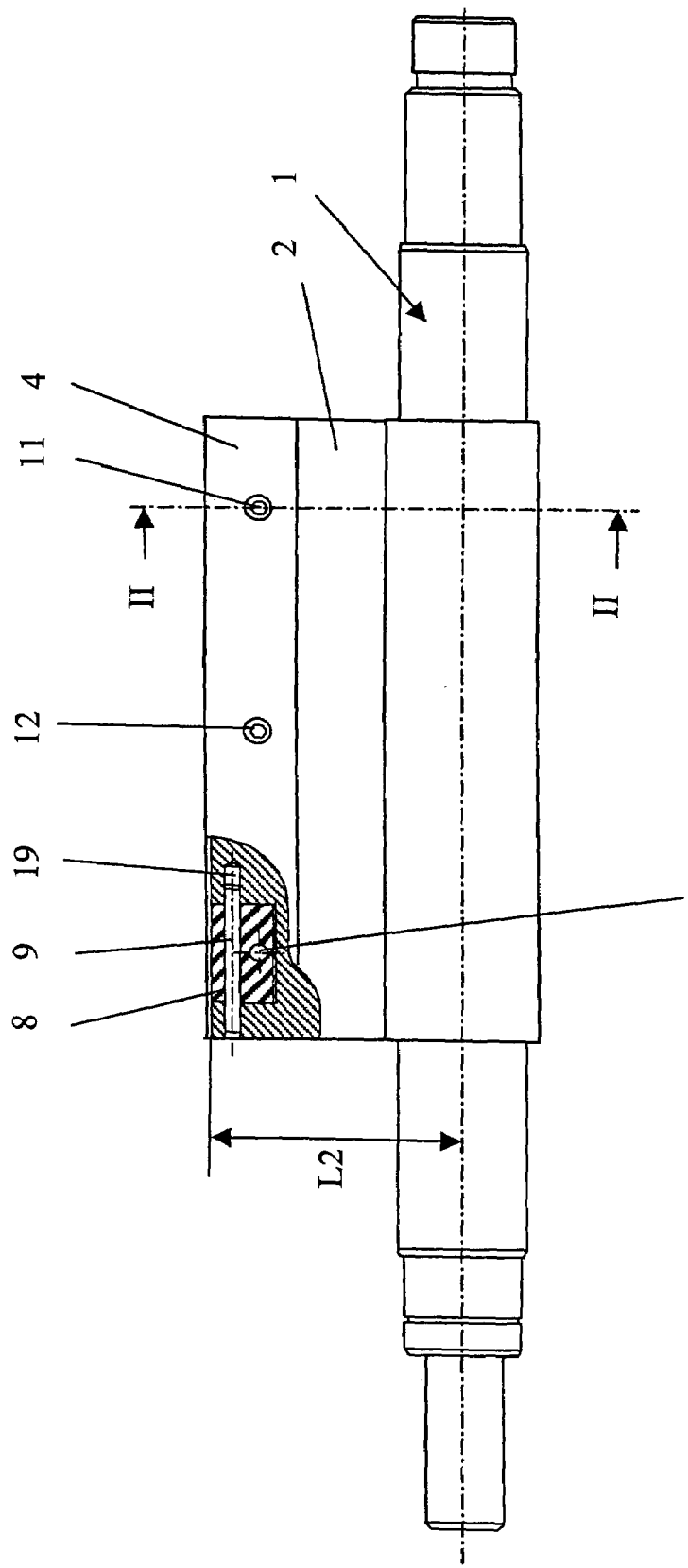
FIG. 3: longitudinal view of the arrangement in accordance with FIG. 1 with partially cut upper part in the cellular wheel web

Further the end strips 3, 4 are each penetrated from the outside by screws 11, 11a, which only engage with their bolt-side ends in the arranged boreholes in the displacement bodies 7, 8. This defines the length L1 and the corresponding compensation play occurs in reference to the length L2, as depicted in FIG. 3.

Of course in the design of the length L1 the expansion of the end strips 3 and 4 from the fixed point of the axis of the screw 11 up to its upper edge pointing to the case interior is taken into consideration.

The advantage of this embodiment is that one can dispense with the recesses 5, 6 in the cellular wheel webs 2, however it is necessary to arrange corresponding recesses in the end strips 3, 4.

The recesses can also be arranged partially in the cellular wheel webs and partially in the end strips.

Overall the advantage results that the bimetallic effect previously given in the state of the art is excluded, because the displacement bodies 7, 8 only have a slight axial length and each displacement body is only connected once to the cellular wheel web, so that a warping or bulging of a larger axial length of the displacement bodies against a multiple fastening can no longer take place.

An additional advantage is that the displacement bodies are now no longer held in a narrow slot of a cellular wheel web where they can lead to jamming occurrences, but rather that they are supported with great play in integrated recesses either in the cellular wheel web or in the end strips or between them.

The second embodiment will now be described in greater detail with the help of the following FIGS. 5 through 13. Note that the description of the parts of the first embodiment also applies for the parts of the same name of the second embodiment.

Figure 5:
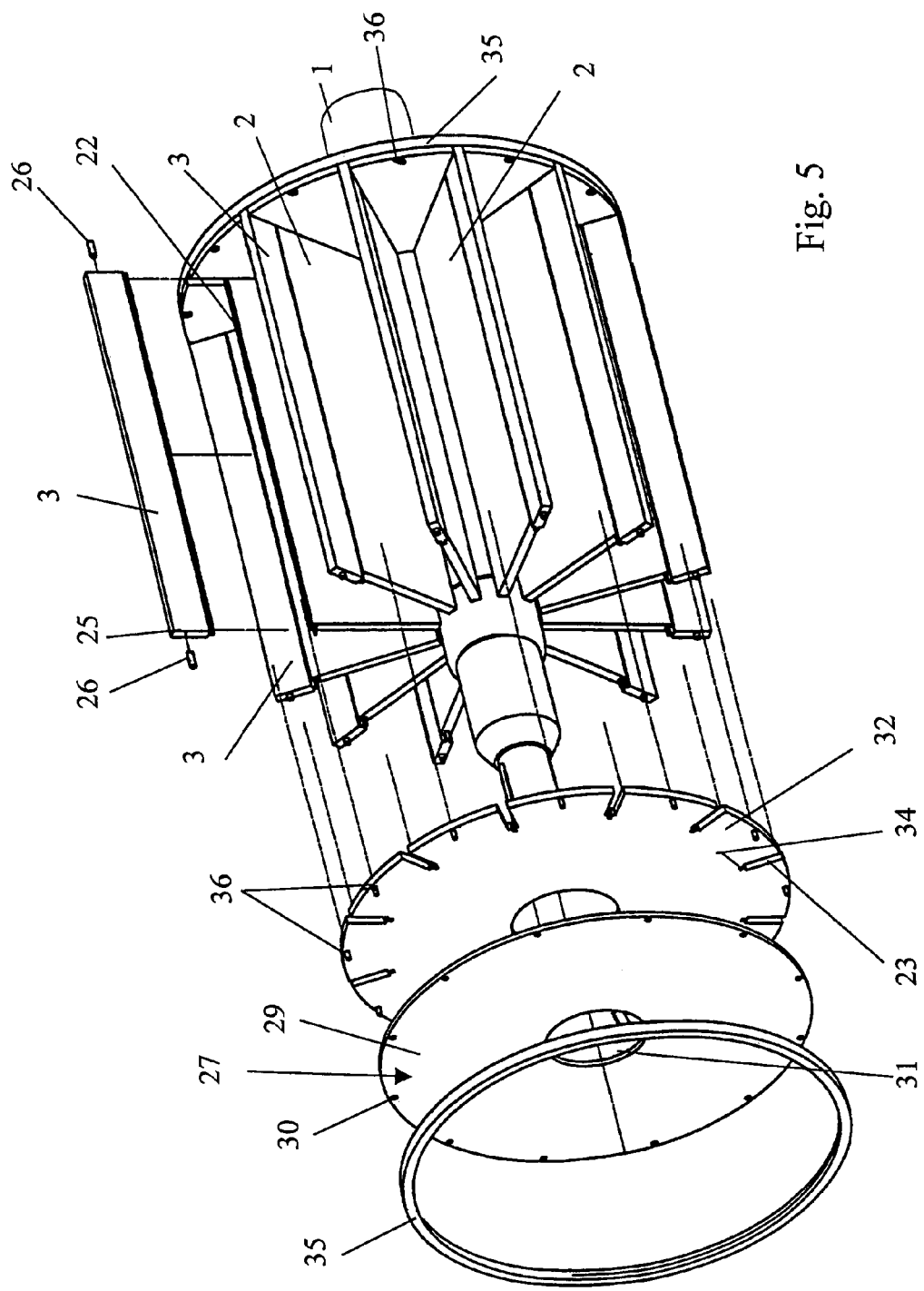
FIG. 5: a partially exploded view of a cellular wheel sluice with novel temperature compensation

FIG. 5 shows a cellular wheel in partially exploded view and a number of cellular webs 2 are fastened on the cellular wheel shaft 1 uniformly distributed on the periphery.

These cellular wheel webs are preferably made of a nickel chromium alloy (material 1.4541).

As per FIG. 10 longitudinal slots 22 running in axial direction are in-wrought at the radial exterior ends of the cellular wheel webs 2, in which integrated extensions 33 of end strips 3 engage, which are preferably made of the same material as the cellular wheel webs 2.

With that the end strips 3 have a clearance of motion in radial direction (direction of arrow 24 in FIG. 10) on the front ends of the cellular wheel webs 2.

Reference is also made to the fact that instead of a front end displacement guide, as shown in FIG. 10, other radial displacement guides can also be used in the direction of arrows 24, as for example also explained in FIG. 1 according to the first embodiment. There the displacement guide consisted of radial, outwardly opened, pocket-like guides.

It is important that in the front ends of the end strip 3 axially pointing away from each other at least one pin 26 is present, which is inserted free from backlash in a borehole 25 arranged there. However, other backlash free fastenings can also be selected instead of a pin-borehole support.

Now it is important that the pins or bolts 26 through integrated radial slots 23 in the region of a side disk 32 and that integrated recesses 34 are present on the base of the radial slots 23, said recesses being in alignment with the longitudinal slots 22.

In this connection a processing of the side disk 32 is preferred for reasons, in which the side disk 32 is first firmly welded to cellular wheel shaft 1 and the cellular wheel webs 2, in order to fit the integrated longitudinal slots 22 into the cellular wheel webs 2. For this reason the longitudinal slots 22 in the front ends of the cellular wheel webs 2 align with the integrated recesses 34 on the base of the radial slots 23 in the region of the side disk 32.

The previously mentioned pins 26 now engage backlash free and custom fit in integrated boreholes 30 of a retention device 27, whereby these boreholes 30 are arranged in uniform distribution on the periphery corresponding to the grid mass of the end strips 3.

The retention device 27 is constructed as an expansion-stable fixing unit for the end strips 3, which consequently are always—regardless of the temperature influences—kept at an equal outside diameter, because the retention device 27 is firmly connected to the cellular wheel shaft 1.

In the shown embodiment the retention device 27 consists of a through disk 19. However, the invention is not limited to this. Another embodiment according to FIGS. 12 and 13 provides that the disk is split up into individual spokes 39 directed radially outward and the spokes in turn form the expansion-stable retention device 27.

Mention is also made of the fact that a cover ring 35 is used for front end coverage of the disk 29 and the side disk 32, said ring being slipped on bolts 36 that are arranged in uniform distribution, said bolts in turn being arranged custom fit and backlash free on the outer periphery of the side disk 32.

The purpose of this cover ring 35 is the front end covering of the disk 29 and the side disk 32, in order to prevent a penetration of powder or granulate material from the front end into the interior of the cellular wheel.

The basic principle of this second embodiment is schematically depicted in FIGS. 9 and 10. There it can be recognized that a rigid (axial) connection 28 to the expansion-stable retention device 27 is given via bolt 26 and borehole 25, so that at least the radially outward lying edge of the end strip 3 is always kept at an equal diameter in the direction of the case wall (42) of the cellular wheel sluice, regardless of how the radial clearance of the underlying cellular wheel web is. With this a constant gap 42 results over the temperature range of about 20° to 150° Celsius.

FIG. 9 uses arrows to schematically represent the fact that the material of the cellular wheel webs and the end strips can exhibit an expansion coefficient ten times higher than the material of the retention device 27 (represented by the shorter arrow).

Both expansions go in the same direction and compensate each other consequently, because the deciding (determining the diameter of the rotor) end strips 3 are always kept expansion-stable at an equal outer radial diameter regardless of changing temperatures.

In contrast to this the embodiment according to FIGS. 1 through 4 is schematically depicted in FIG. 8. There it is specified that a specified clearance in the one direction is compensated for with a homogenous clearance in the other direction.

This is represented by the two smaller and shorter arrows.

These opposed clearances are achieved by means of variable plastic-metal material combination.

FIG. 7 on the other hand shows the state of the art, where it can be recognized that a great clearance in the one direction is compensated for with an equally great opposite clearance in the other direction.

Related to the axial length of the cellular wheel web this results in the known bimetallic effect.

FIG. 6 shows the temperature-dependent clearance of the used materials.

The temperature range between 20° and 140° Celsius is specified, and it is described that also the retention device in accordance with the straight line 37 can exhibit a certain (slight) clearance. This clearance is however only one tenth of the material of the rotor expansion (end webs and cellular wheel webs), whose materials consist of nickel chromium steel. This slight clearance is compared to the greater clearance of the case (straight line 38). The distance between the intersecting points of the straight lines 37 and 38 indicates the gap width at the temperature 20 degrees Celsius. Consequently, depending on the type of the selected material and the used radial length of the retention device (straight lines 37, 37a, 37b) one can stabilize the gap dimension above the specified temperature range.

Straight lines 37a and 37b also specify that in dependence on the radial length of the retention device 27 different gradients of the straight lines 37a, 37b can be achieved and therefore corresponding to the length of the retention device 27 different gap dimensions can be set. This length 41 is plotted in FIG. 13.

FIGS. 12 and 13 depict a further embodiment in which the retention device 27 can also be realized spoke-shaped by means of spokes 39, which uniformly distributed on the periphery of cellular wheel shaft 1 point radially outward.

It is important in this embodiment that each spoke 39 is fastened with a radial internal base bolt 40 to the side disk 32 and that the radial external end of each spoke 39 is connected to the respective end strip 3 firmly and backlash free with the help of the previously mentioned bolt. 26.

The further the base bolt 40 is removed from the rotary midpoint of cellular wheel shaft 1, the shorter the length of the spoke 39 and accordingly the shorter also the length 41, which accordingly leads to a greater expansion of the end strips 3 in radial direction and this is depicted by the gradient of straight lines 37a and 37b.

For example, only 60% or 30% compensating properties result in comparison to the 90% compensating properties of a through disk 29 in accordance with FIG. 5.

This had the advantage that in the selection of the desired length 41 one can in practice set any desired gap which remains stable above a certain temperature difference.

The embodiment as per FIG. 5 depicts the fact that the center borehole 31 of the retention device 27 (represented by the disk 29) is firmly fastened on the cellular wheel shaft 1, as is the case with the center borehole of the side disk 32.

KEY TO THE DRAWINGS

| | |
|---|---|
| 1 | Cellular wheel shaft |
| 2 | Cellular wheel web |
| 3 | End strip |
| 4 | End strip |
| 5 | Recess |
| 6 | Recess |
| 7 | Displacement body |
| 8 | Displacement body 8a |
| 9 | Pin |
| 10 | Pin |
| 11 | Screw 11a |
| 12 | Screw |
| 13 | Oblong hole |
| 14 | Borehole |
| 15 | Borehole |
| 16 | Borehole |
| 17 | Borehole |
| 18 | Gasket cord |
| 19 | Borehole |
| 20 | Recess |
| 21 | Recess |
| 22 | Longitudinal slot |
| 23 | Radial slot |
| 24 | Direction of arrow |
| 25 | Borehole |
| 26 | Pin |
| 27 | Retention device |
| 28 | Connection |
| 29 | Disk |
| 30 | Borehole |
| 31 | Center borehole |
| 32 | Side disk |
| 33 | Extension |
| 34 | Recess |
| 35 | Cover |
| 36 | Bolt |
| 37 | Straight line 37a, 37b |
| 38 | Straight line |
| 39 | Spoke |
| 40 | Base bolt |
| 41 | Length |
| 42 | Case wall |
| 43 | Gap |

The invention claimed is:

1. A cellular wheel sluice for supplying hot bulk material, comprising:
   a housing having a housing wall;
   a cellular wheel in said housing, said wheel comprising:
      a shaft;
      a plurality of cellular wheel webs connected to said shaft and uniformly distributed peripherally about the shaft;
      a plurality of end strips respectively disposed on radial ends of said wheel webs, the radial extension of said strips defining a gap from the housing wall;
      said end strips being connected to and fixed with respect to their radial extensions by means of a retaining device at each axial end face of the end strips;
   the retaining devices being in the form of one of a ring-shaped flat material, a disk-shape flat material or a spoke-shaped flat material having a low coefficient of thermal expansion, whereby the radial extension of said end strips is held at a temperature independent constant external diameter with respect to said shaft and therefore a temperature independent constant spacing from said housing wall.

2. The cellular wheel sluice of claim 1, wherein the axial end faces of said end strips face and are connected to said retaining devices, and said end strips are guided with respect to the radial ends of the respective wheel webs; and including radial displacement guides connecting said end strips to respective said wheel webs to enable relative radial motion between the end strips and respective wheel webs.

3. The cellular wheel sluice of claim 2, wherein the retaining devices are formed as a side disk or a side ring.

4. The cellular wheel sluice of claim 3, wherein said retaining devices consist essentially of a nickel/iron alloy with about 36% nickel content having a very low thermal expansion coefficient and which is substantially dimensionally constant in the temperature range from 20° C. to 140° C.

5. The cellular wheel sluice of claim 3, wherein the radial ends of said wheel webs include longitudinal grooves and said end strips include extensions displaceably radially guided within the grooves of said wheel webs.

6. The cellular wheel sluice of claim 3, wherein said end strips and said wheel webs consist essentially of the same material.

7. The cellular wheel sluice of claim 2, wherein said retaining devices comprise a plurality of spokes fixed on said shaft.

8. The cellular wheel sluice of claim 7, wherein said retaining devices consist essentially of a nickel/iron alloy with about 36% nickel content having a very low thermal expansion coefficient and which is substantially dimensionally constant in the temperature range from 20° C. to 140° C.

9. The cellular wheel sluice of claim 7, wherein the radial ends of said wheel webs include longitudinal grooves and said end strips include extensions displaceably radially guided within the grooves of said wheel webs.

10. The cellular wheel sluice of claim 7, wherein said end strips and said wheel webs consist essentially of the same material.

11. The cellular wheel sluice of claim 2, wherein said retaining devices consist essentially of a nickel/iron alloy with about 36% nickel content having a very low thermal expansion coefficient and which is substantially dimensionally constant in the temperature range from 20° C. to 140° C.

12. The cellular wheel sluice of claim 2, wherein the radial ends of said wheel webs include longitudinal grooves and said end strips include extensions displaceably radially guided within the grooves of said wheel webs.

13. The cellular wheel sluice of claim 2, wherein said end strips and said wheel webs consist essentially of the same material.

14. The cellular wheel sluice of claim 1, wherein the retaining devices are formed as a side disk or a side ring.

15. The cellular wheel sluice of claim 1, wherein said retaining devices comprise a plurality of spokes fixed on said shaft.

16. The cellular wheel sluice of claim 1, wherein said retaining devices consist essentially of a nickel/iron alloy with about 36% nickel content having a very low thermal expansion coefficient and which is substantially dimensionally constant in the temperature range from 20° C. to 140° C.

17. The cellular wheel sluice of claim 16, wherein the radial ends of said wheel webs include longitudinal grooves and said end strips include extensions displaceably radially guided within the grooves of said wheel webs.

18. The cellular wheel sluice of claim 1, wherein the radial ends of said wheel webs include longitudinal grooves and said end strips include extensions displaceably radially guided within the grooves of said wheel webs.

19. The cellular wheel sluice of claim 16, wherein said end strips and said wheel webs consist essentially of the same material.

20. The cellular wheel sluice of claim 19, wherein said end strips and said wheel webs consist essentially of the same material.

21. The cellular wheel sluice of claim 1, wherein said end strips and said wheel webs consist essentially of the same material.

* * * * *

UNITED STATES PATENT AND TRADEMARK OFFICE
CERTIFICATE OF CORRECTION

| | |
|---|---|
| PATENT NO. | : 7,419,358 B2 |
| APPLICATION NO. | : 11/212129 |
| DATED | : September 25, 2006 |
| INVENTOR(S) | : Dieter Heep |

It is certified that error appears in the above-identified patent and that said Letters Patent is hereby corrected as shown below:

Title page, item [54] in the title: After "SLUICE" delete "ROTORS" and insert --ROTOR--

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,419,358 B2  
APPLICATION NO. : 11/212129  
DATED : September 25, 2006  
INVENTOR(S) : Dieter Heep Page 1 of 1

It is certified that error appears in the above-identified patent and that said Letters Patent is hereby corrected as shown below:

Title page, item [54] and Column 1, line 4, in the title: After "SLUICE" delete "ROTORS" and insert --ROTOR--

This certificate supersedes the Certificate of Correction issued November 11, 2008.

Signed and Sealed this

Ninth Day of December, 2008

JON W. DUDAS  
*Director of the United States Patent and Trademark Office*

UNITED STATES PATENT AND TRADEMARK OFFICE
CERTIFICATE OF CORRECTION

PATENT NO. : 7,419,358 B2  Page 1 of 1
APPLICATION NO. : 11/212129
DATED : September 2, 2008
INVENTOR(S) : Dieter Heep It is certified that error appears in the above-identified patent and that said Letters Patent is hereby corrected as shown below:

Title page, item [54] and Column 1, line 4, in the title: After "SLUICE" delete "ROTORS" and insert --ROTOR--

This certificate supersedes the Certificates of Correction issued November 11, 2008 and December 9, 2008.

Signed and Sealed this

Thirtieth Day of December, 2008

JON W. DUDAS
*Director of the United States Patent and Trademark Office*